(12) United States Patent
Takabe

(10) Patent No.: US 8,398,494 B2
(45) Date of Patent: Mar. 19, 2013

(54) CONSTANT VELOCITY UNIVERSAL JOINT

(75) Inventor: Shinichi Takabe, Iwata (JP)

(73) Assignee: NTN Corporation, Osaka (JP)

( * ) Notice: Subject to any disclaimer, the term of this patent is extended or adjusted under 35 U.S.C. 154(b) by 23 days.

(21) Appl. No.: 12/999,676

(22) PCT Filed: Jun. 30, 2009

(86) PCT No.: PCT/JP2009/061898
§ 371 (c)(1),
(2), (4) Date: Dec. 17, 2010

(87) PCT Pub. No.: WO2010/013569
PCT Pub. Date: Feb. 4, 2010

(65) Prior Publication Data
US 2011/0092297 A1 Apr. 21, 2011

(30) Foreign Application Priority Data
Jul. 30, 2008 (JP) ................................ 2008-196535

(51) Int. Cl.
*F16D 3/223* (2011.01)
*F16D 3/84* (2006.01)

(52) U.S. Cl. ........................................ 464/145; 464/906

(58) Field of Classification Search ................. 464/111, 464/139–141, 142–146, 904–906
See application file for complete search history.

(56) References Cited

U.S. PATENT DOCUMENTS

| 4,556,400 A | * | 12/1985 | Krude et al. | |
| 2003/0047883 A1 | | 3/2003 | Imazu et al. | |
| 2006/0205522 A1 | * | 9/2006 | Ichikawa et al. | 464/145 |

FOREIGN PATENT DOCUMENTS

| JP | 4-71822 | 6/1992 |
| JP | 05-149346 | 6/1993 |
| JP | 07-305731 | 11/1995 |
| JP | 08-086319 | 4/1996 |
| JP | 10-122257 | 5/1998 |
| JP | 2001-173672 | 6/2001 |
| JP | 2002-257152 | 9/2002 |
| JP | 1 293 692 | 3/2003 |
| JP | 2003-83449 | 3/2003 |
| JP | 2007-057071 | 3/2007 |

OTHER PUBLICATIONS

"Pick a Parameter . . . But Not Just Any Parameter." IMPCO Machine Tools. Jul. 15, 2006, [online], [retrieved on Mar. 28, 2012] Retrieved from the Internet <URL:http://web.archive.org/web/20060715092704/http://www.impco.com/pickapara.htm>.*
Universal Joint and Driveshaft Design Manual. Warrendale, PA: Society of Automotive Engineers, 1979. p. 147-149. TJ1059.S62.*

(Continued)

*Primary Examiner* — Gregory Binda
*Assistant Examiner* — Josh Skroupa
(74) *Attorney, Agent, or Firm* — Wenderoth, Lind & Ponack, L.L.P.

(57) ABSTRACT

A constant velocity universal joint has a boot with enhanced durability and compactness, which are achieved by suppressing abrasion of the boot. The constant velocity universal joint includes an outer joint member, an inner joint member, a torque transmitting member, a shaft, and a boot. The surface roughness of an outer peripheral surface of the shaft satisfies Rsk<0, Rpk<2 μm, and Ra<4 μm.

9 Claims, 5 Drawing Sheets

OTHER PUBLICATIONS

International Preliminary Report on Patentability and Written Opinion of the International Searching Authority issued Mar. 17, 2011 in International (PCT) Application No. PCT/JP2009/061898.

International Search Report issued Aug. 18, 2009 in International (PCT) Application No. PCT/JP2009/061898.

* cited by examiner

| Conditions and Results<br>Sample | Rsk | Rpk ($\mu$m) | Ra ($\mu$m) | Abration Amount (mm) |
|---|---|---|---|---|
| S1 (comparative example) | 0.5 | 11 | 6.1 | 0.8 |
| S2 (example) | -0.1 | 1.2 | 3.9 | 0.3 |
| S3 (example) | -0.5 | 1.3 | 2.9 | 0.2 |
| S4 (example) | -1.3 | 0.6 | 0.9 | less than 0.1 |
| S5 (example) | -0.5 | 0.7 | 0.5 | less than 0.1 |

CONSTANT VELOCITY UNIVERSAL JOINT

TECHNICAL FIELD

The present invention relates to a constant velocity universal joint used, for example, for a drive shaft of an automobile.

Constant velocity universal joints are roughly classified into fixed type joints which solely allow angular displacement between input and output shafts and slide type joints in which angular displacement and axial displacement are permissible, and the kind of the joint to be used is selected according to its application, condition of use, etc.

In a constant velocity universal joint of any of a fixed type and a Plunging type, an outer joint member, an inner joint member, a torque transmitting member, a shaft, and a boot are provided as main components. The outer joint member has a cup-shaped member opened at one end. The inner joint member is located in inside of the cup-shaped part. The torque transmitting members transmit torque between the outer joint member and the inner joint member. The shaft is coupled with the inner joint member so as to transmit torque and extends from an opening of a cup-shaped part of the outer joint member. The boot has one end fixed to an outer peripheral surface of the outer joint member and another end fixed to an outer peripheral surface of the shaft, and is elastically flexural.

The boot is provided to prevent leakage of lubricant (grease or the like) sealed in the inside of the constant velocity universal joint and intrusion of foreign matters into the inside of the joint. When the constant velocity universal joint forms an operational angle or slides, the boot follows the movement thereof and is deformed. For example, when the constant velocity universal joint forms an operational angle, the boot is compressed in size on a side on which the shaft is inclined with respect to the outer joint member, and the boot is conversely extended on the opposite side. In this case, the inner surface of the boot on the compressed side is liable to be brought into contact with the outer peripheral surface of the shaft. Owing to the contact, abrasion may occur on the inner surfaces of the boot. The abrasion on those inner surfaces of the boot causes decrease in durability of the boot.

Meanwhile, in recent years, needs of downsizing and compactification especially of a constant velocity universal joint for an automobile have been sophisticated. The boot designed compactly in outer diameter and axial dimension has also been demanded. Meanwhile, in order to suppress the above-mentioned abrasion on the inner surfaces of the boot, the diameter of the boot is generally increased. That is, in order to simultaneously achieve compactification of the boot and suppression of abrasion on the inner surfaces of the boot, it is necessary to provide other solutions.

Except increase in diameter of the boot, various methods of suppressing abrasion of the boot have been suggested. For example, in the invention disclosed in Patent Document 1, ingredients for suppressing abrasion and abnormal noise of the boot are added to the material for the boot. In the invention disclosed in Patent Document 2, a synthetic resin composition prepared by being mixed with resin powder of ethylene tetrafluoride is provided as a discontinuous coating film on the surfaces of the boot formed of a diene-based rubber material. An object of the inventions disclosed in Patent Documents 3 and 4 is to suppress abrasion of the boots through adoption of the characteristic shapes of the boots.

[Patent Document 1] JP 2001-173672 A
[Patent Document 2] JP 08-086319 A
[Patent Document 3] JP 2002-257152 A
[Patent Document 4] JP 05-149346 A

SUMMARY OF THE INVENTION

Problems to be Solved by the Invention

However, in the invention of Patent Document 1, suppression of abrasion and abnormal noise can be expected to some extent. However, the suppression is insufficient, thereby causing decrease in fatigue resistance and aging resistance of the boot and decrease in sealing properties of the fixed portion of the boot with respect to the outer joint member and the shaft. Therefore, it is difficult to say that the suppression of abrasion and abnormal noise is a sufficient countermeasure therefor. Also in the case of forming the discontinuous coating film according to the invention of Patent Document 2 on the inner surfaces of the boot, it is impossible to sufficiently suppress abrasion on the inner surfaces of the boot. Further, in both the inventions of Patent Documents 3 and 4, means for suppressing abrasion on the inner surfaces of the boot are insufficient, and hence it is difficult to enhance durability of the boot and the compactness of the same.

The present invention has been made in view of the above-mentioned circumstances, and an object thereof is to provide a constant velocity universal joint in which a boot can be enhanced in durability and compactness, which are achieved by suppressing abrasion of the boot.

Means for Solving the Problems

In order to attain the above-mentioned object, a first aspect of the invention includes: an outer joint member; an inner joint member located in inside of the outer joint member; a torque transmitting member for transmitting torque between the outer joint member and the inner joint member; a shaft coupled with the inner joint member so as to transmit torque and extending from an opening of the outer joint member; and a boot having one end fixed to the outer joint member and another end fixed to the shaft, in which at least a part of an outer peripheral surface of the shaft, which is positioned between a part coupled with the inner joint member and a part to which the another end of the boot is fixed, constitutes a surface roughness control part satisfying $Rsk<0$, $Rpk<2$ μm, and $Ra<4$ μm.

Herein, Rsk and Ra are defined according to JIS B0601: 2001, and Rpk is defined according to JIS B0671-2:2002.

According to the first aspect of the invention, if the surface roughness control part is a part with which inner surfaces of the boot are brought into contact when the constant velocity universal joint forms an operational angle, abrasion on the inner surfaces of the boot is suppressed even when the inner surfaces of the boot are brought into contact with the outer peripheral surface. As a result, it is possible to achieve enhancement in durability of the boot and compactification of the boot.

In a second aspect of the invention, according to the first aspect of the invention, the surface roughness control part is constituted by a surface of a coating film which coats the shaft.

According to the second aspect of the invention, it becomes unnecessary to increase the surface roughness of the shaft itself. Therefore, it is possible to relax conditions for turning on the shaft (feeding speed and the like), which are set for increasing the surface roughness, and hence possible to save manufacturing cost of the shaft itself.

In a third aspect of the invention, according to the first or second aspect of the invention, the surface roughness control part is brought into contact with an inner surface of the boot in a state in which the constant velocity universal joint forms an operational angle.

In this context, in the third aspect of the invention, the boot having a regulated contact part includes one which is changed in shape in accordance with use of the constant velocity universal joint in comparison with that obtained immediately after being manufactured.

According to the third aspect of the invention, even when the inner surfaces of the boot are brought into contact with the outer peripheral surface, abrasion on the inner surfaces of the boot is suppressed. As a result, it is possible to achieve enhancement in durability of the boot and compactification of the boot.

In a fourth aspect of the invention, according to the invention of any one of the first to third aspects, the surface roughness control part satisfies Rsk<0, Rpk<2 μm, and Ra<3 μm instead of Rsk<0, Rpk<2 μm, and Ra<4 μm.

According to the fourth aspect of the invention, the same operational effects as those of the first aspect of the invention can be obtained more effectively.

In a fifth aspect of the invention, according to the invention of any one of the first to third aspects, the surface roughness control part satisfies Rsk<0, Rpk<1 μm, and Ra<1 μm instead of Rsk<0, Rpk<2 μm, and Ra<4 μm.

According to the fifth aspect of the invention, the same operational effects as those of the invention of the first aspect can be obtained more effectively.

In a sixth aspect of the invention, according to the invention of any one of the first to fifth aspects, the boot has a bellows-like part.

According to the sixth aspect of the invention, valley portions of the bellows-like part of the boot are easily brought into contact with the outer peripheral surface. Therefore, the same operational effects as those of the first aspect of the invention can be obtained more remarkably.

In a seventh aspect of the invention, according to the invention of any one of the first to sixth aspects, the boot is made of thermoplastic polyester elastomer.

According to the seventh aspect of the invention, it is possible to enhance abrasion resistance, fatigue resistance, and heat aging resistance of the boot.

In an eighth aspect of the invention, according to the invention of any one of the first to seventh aspects, the constant velocity universal joint constitutes a fixed type constant velocity universal joint capable of forming an operational angle of 45° or larger.

According to the eighth aspect of the invention, the constant velocity universal joint more frequently form a large operational angle, and hence the inner surfaces of the boot are easily brought into contact with the outer peripheral surface. Therefore, the same operational effects as those of the first aspect of the invention can be obtained more remarkably.

Effects of the Invention

According to the present invention, it is possible to provide a constant velocity universal joint in which a boot can be enhanced in durability and compactness, which are achieved by suppressing abrasion of the boot.

DETAILED DESCRIPTION OF THE INVENTION

In the following, an embodiment of the present invention is described.

Figure 1:
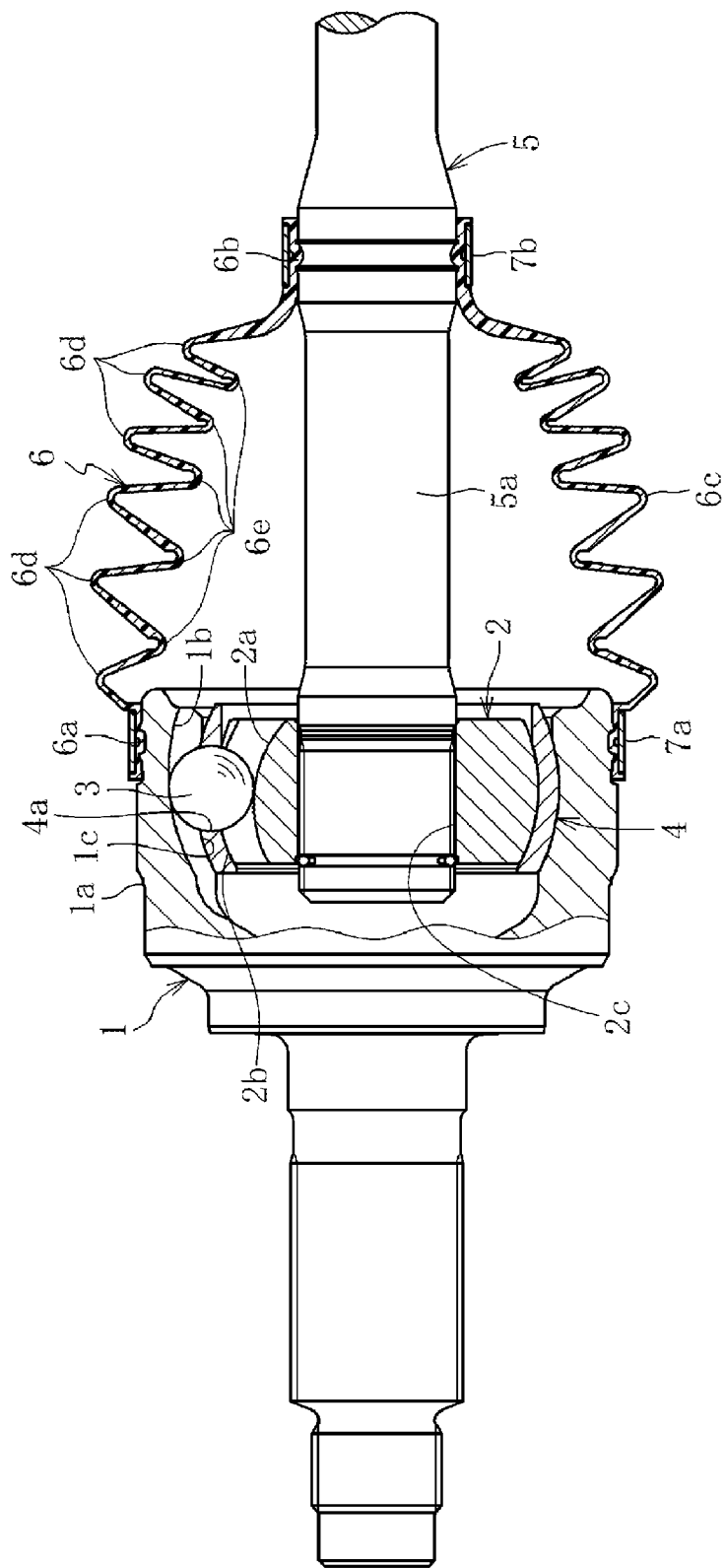
FIG. 1 A longitudinal sectional view of a fixed type constant velocity universal joint according to an embodiment of the present invention.

FIG. 1 illustrates a fixed type constant velocity universal joint according to the embodiment of the present invention. The fixed type constant velocity universal joint is a Birfield type one which is capable of forming an operational angle of 45° or more. The constant velocity universal joint includes an outer joint member 1, an inner joint member 2, a ball 3 serving as a torque transmitting member, a retainer 4, a shaft 5, and a boot 6 as main components.

The outer joint member 1 has a cup-shaped mouth portion 1a opening at one end, and is provided therein with a spherical inner surface 1c in which multiple track grooves 1b are formed. The inner joint member 2 is located in a radial inside of the mouth portion 1a of the outer joint member 1, and is provided with a spherical outer surface 2b in which multiple track grooves 2a are formed and an axial hole 2c. The balls 3 are arranged in ball tracks formed by cooperation of the track grooves 1b of the outer joint member 1 and the track grooves 2a of the inner joint member 2, and transmit torque between the outer joint member 1 and the inner joint member 2. The retainer 4 has pockets 4a arranged between a spherical inner surface 1c of the outer joint member 1 and a spherical outer surface 2b of the inner joint member 2, for accommodating the balls 3.

The shaft 5 is coupled with the axial hole 2c of the inner joint member 2, for example, by spline fitting so as to transmit torque and extends from an opening of the mouth portion 1a of the outer joint member 1. In the boot 6, a large diameter end portion 6a is fixed to an outer peripheral surface of the mouth portion 1a of the outer joint member 1 with use of a boot band 7a, and a small diameter end portion 6b is fixed to an outer peripheral surface of the shaft 5 with use of a boot band 7b. Between the large diameter end portion 6a and the small diameter end portion 6b, the boot 6 has a bellows portion 6c having a bellows-like shape and being elastically flexural. The bellows portion 6c is constituted, for example, by two to seven peak portions 6d and valley portions 6e provided between the peak portions 6d. An arbitrary bellows-like shape is applicable to the bellows portion 6c. The boot 6 prevents leakage of lubricant sealed in the inside of the constant velocity universal joint to the outside and intrusion of foreign matters into the inside of the joint. Preferable examples of the material for the boot 6 include thermoplastic polyester elastomer excellent in fatigue resistance, abrasion resistance, heat aging resistance, and the like. However, the material for the boot 6 is not particularly limited thereto. For example, chloroprene rubber, silicone rubber, chlorinated polyethylene rubber, ethylene-acrylic rubber, or the like may be used.

Figure 4:
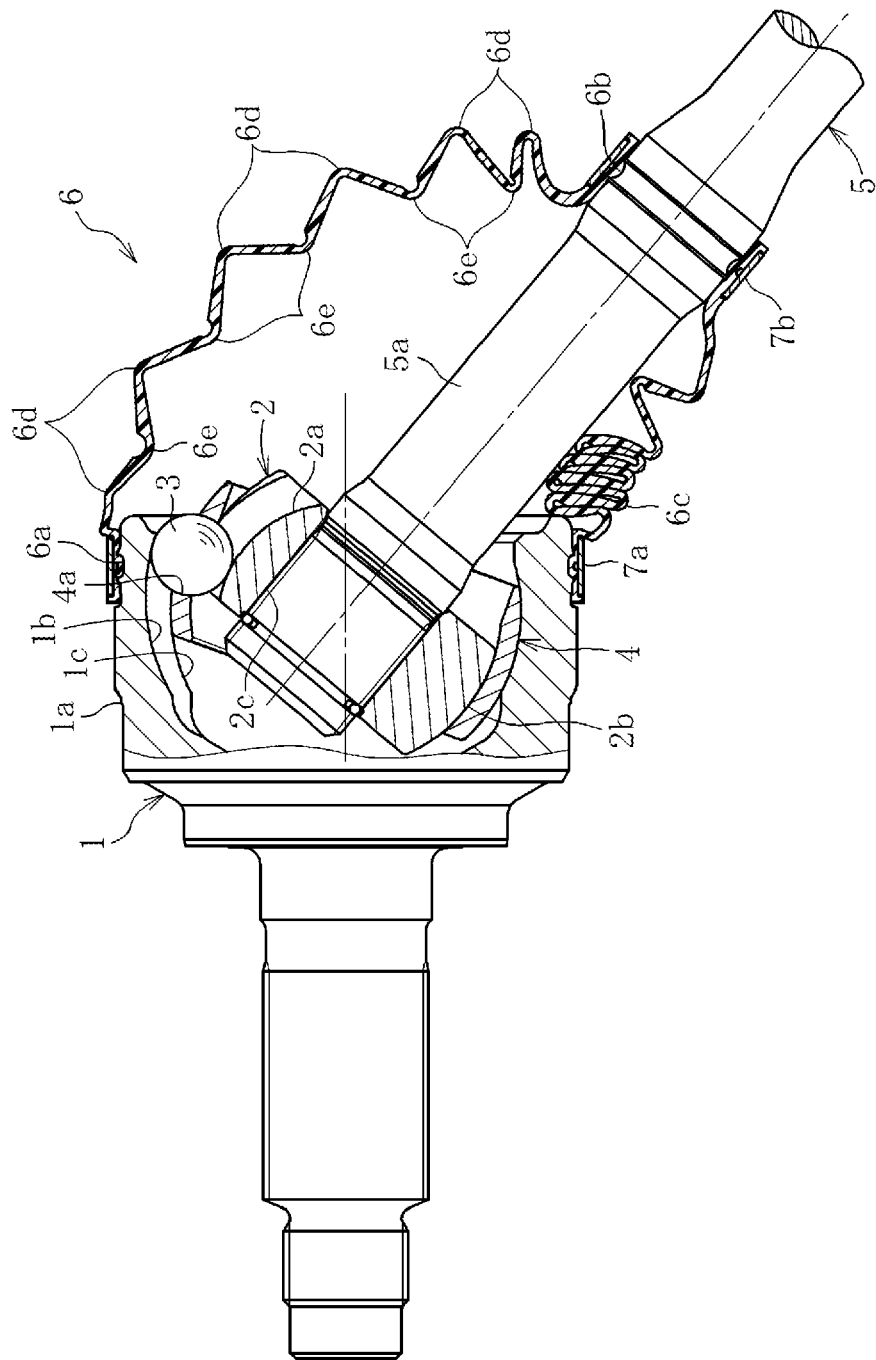
FIG. 4 Another longitudinal sectional view of the fixed type constant velocity universal joint according to the embodiment of the present invention.

The shaft 5 includes a part having a predetermined axial length between a part which is coupled with the axial hole 2c of the inner joint member 2 and a part to which the small diameter end portion 6b of the boot 6 is fixed. An outer peripheral surface 5a (surface roughness control portion) of this part includes apart brought into contact with inner surfaces of the valley portions 6e of the boot 6 when the constant velocity universal joint forms an operational angle, as illustrated in FIG. 4. Surface roughness of the outer peripheral surface 5a satisfies Rsk<0, Rpk<2 μm, and Ra<4 μm, preferably, Rsk<0, Rpk<2 μm, and Ra<3 μm. Further preferably, Rsk<0, Rpk<1 μm, and Ra<1 μm is satisfied.

With the above-mentioned structure, when the constant velocity universal joint forms an operational angle, as illustrated in FIG. 4, and is rotated, abrasion on the inner surfaces of the valley portions 6e is suppressed even when the shaft 5 and the inner surfaces of the valley portions 6e of the boot 6 are brought into contact with each other. Thus, durability of the boot 6 is enhanced. Further, the valley portions 6e of the boot 6 can be designed to have small diameters, and the peak portions 6d of the boot 6 can be designed to have small diameters in accordance therewith. As a result, the boot 6 can be made compact.

The outer peripheral surface 5a of the shaft 5 may be worked by any method. For example, quenching may be performed after turning, or working such as turning or grinding may be performed after quenching. Alternatively, swaging or pressing may be performed.

Figure 5:
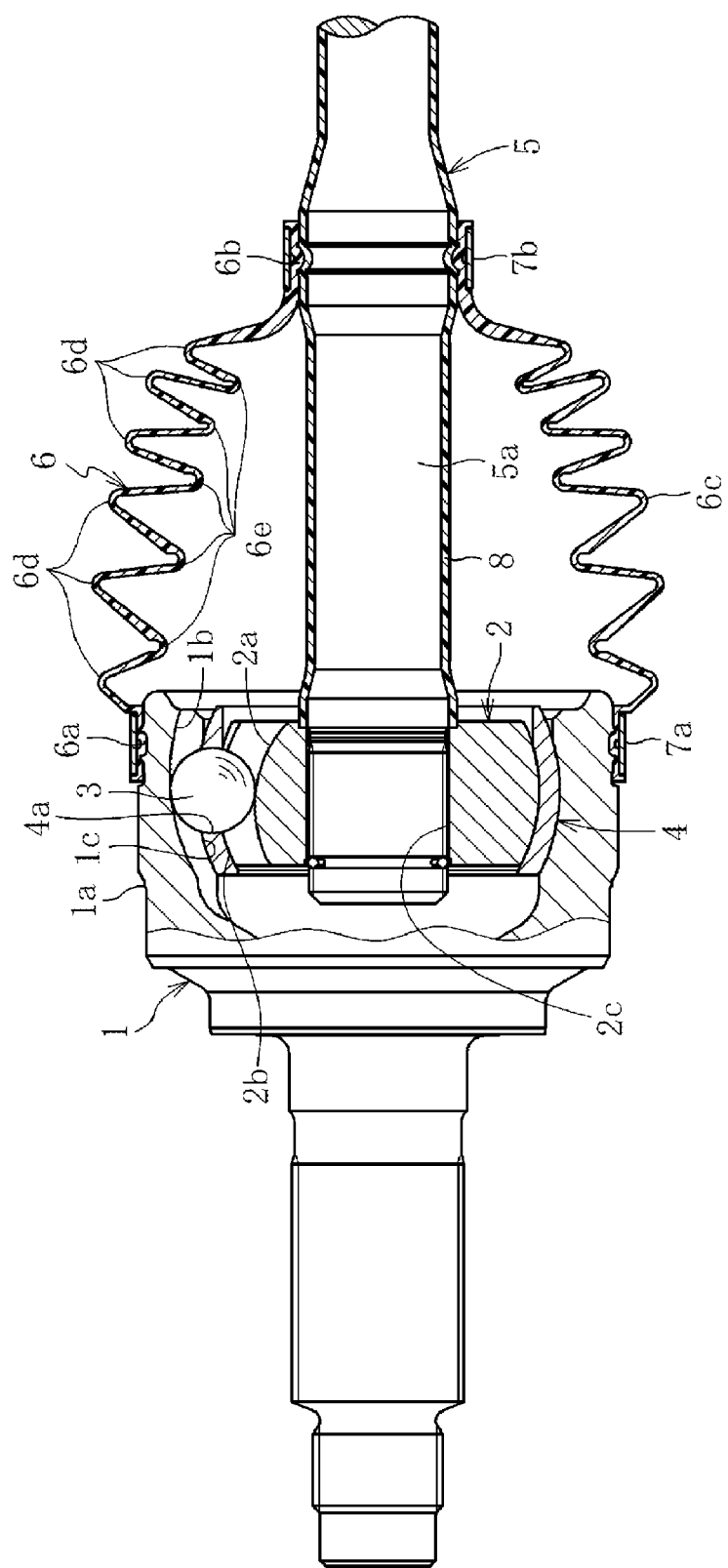
FIG. 5 A longitudinal sectional view of a fixed type constant velocity universal joint according to another embodiment of the present invention.
Figure 6:
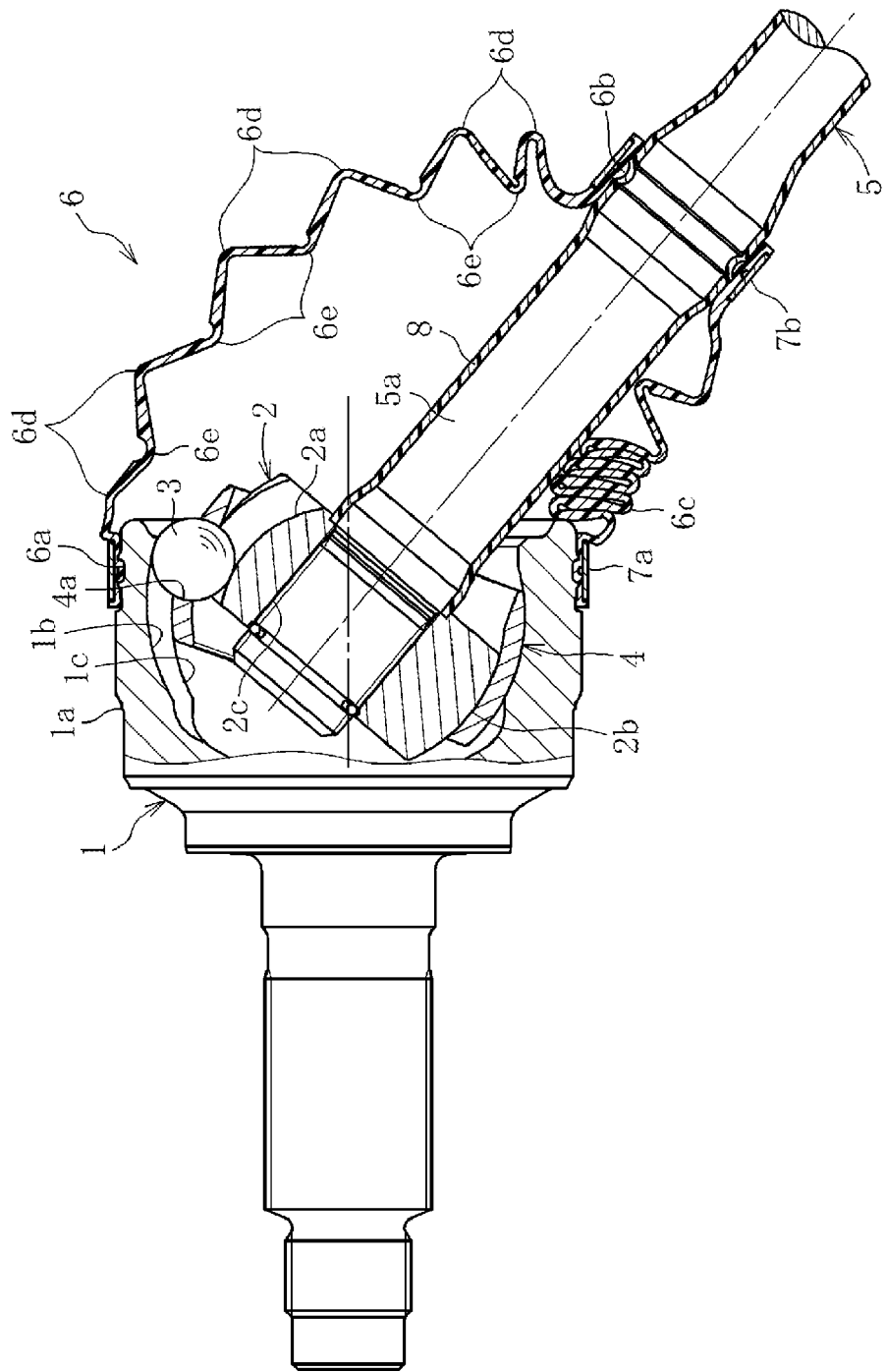
FIG. 6 Another longitudinal sectional view of the fixed type constant velocity universal joint according to the other embodiment of the present invention.

As illustrated in FIG. 5 and FIG. 6, a coating film 8 which coats the outer peripheral surface 5a of the shaft 5 may be formed, and a condition of surface roughness of the coating film 8 may be the same as a condition of the above-mentioned surface roughness of the outer peripheral surface 5a. In this case, the outer peripheral surface 5a in a state of not being coated needs not to satisfy the condition of the above-mentioned surface roughness of the outer peripheral surface 5a. The material for the coating film 8 and a method of forming the same is not particularly limited when a condition of surface roughness thereof satisfies the condition of the above-mentioned surface roughness of the outer peripheral surface 5a. Examples of the method of forming the coating film 8 include a manganese phosphate coating process and painting. Further, in this case, examples of the painting include powder coating, cationic electrodeposition coating, anion electrodeposition coating, electrostatic coating, baking coating, and spray coating.

Example 1

An evaluation test of an abrasion amount of a boot was conducted under the following conditions. operational angle: 40°, number of rotations: 600 rpm, ambient temperature: 25° C.

Figures 2, 3:
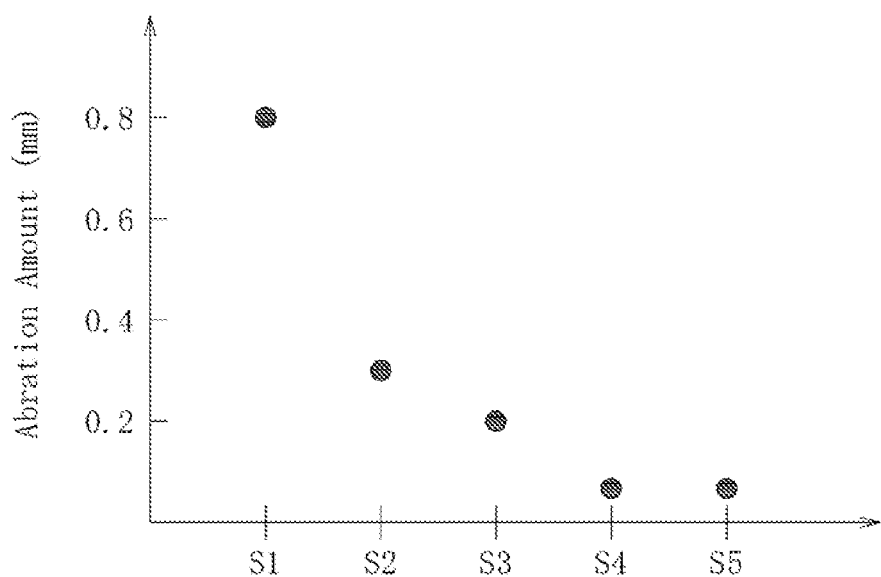
FIG. 2 A table showing conditions and an evaluation test result of an example of the present invention.
FIG. 3 A graph showing a relation obtained from the evaluation test result of the example of the present invention.

FIG. 2 shows conditions of surface roughness of the outer peripheral surface of the shaft used. Note that, S5 was manufactured by subjecting S1 to powder coating, and surface roughness of S5 described above is that of the surface of the coating film formed by painting. All the boots and the constant velocity universal joints except the shafts are of the same specifications.

Rightmost columns of FIG. 2 show abrasion amounts of the inner surfaces of the valley portions of the boots of S1 to S5 after an operation for a predetermined period of time. FIG. 3 shows a relation among the abrasion amounts of S1 to S5. As apparent from FIG. 3, the relation among the abrasion amounts of S1 to S5 were as follows.

S1>>S2>S3>S4≈S5

This result confirms the following. The abrasion amounts of S4 and S5 which satisfy the condition of Rsk<0, Rpk<1 μm, and Ra<1 μm are substantially equal to each other, and the abrasion amount of S3 which does not satisfy this condition but satisfies the condition of Rsk<0, Rpk<2 μm, and Ra<3 μm is larger than those of S4 and S5. The abrasion amount of S2 which does not satisfy this condition but satisfies the condition of Rsk<0, Rpk<2 μm, and Ra<4 μm is larger than that of S3. The abrasion amount of S1 as a comparative example, which does not satisfy this condition, is remarkably larger than that of S2.

In the above-mentioned embodiment, the boot 6 has the bellows portion 6c having a bellows-like shape, and the large diameter end portion 6a is directly fixed to the outer peripheral surface of the mouth portion 1a of the outer joint member 1. However, the present invention is not limited thereto. For example, the large diameter end portion 6a of the boot 6 may be fixed to the outer peripheral surface of the mouth portion 1a of the outer joint member 1 through an intermediation of a metal ring or the like.

In the above-mentioned embodiment, the present invention is applied to a Birfield type fixed type constant velocity universal joint as a constant velocity universal joint. However, the present invention is not limited thereto and applicable, for example, to fixed type constant velocity universal joints of other types such as a Rzeppa type or an undercut free type. Further, the present invention is also applicable to Plunging constant velocity universal joints of a double offset type, a cross groove type, or a tripod type.

In addition, the present invention is not limited to the above-mentioned embodiment, and various modifications can be made thereto without departing from the scope of the technical idea of the present invention.

The invention claimed is:

1. A constant velocity universal joint, comprising:
an outer joint member;
an inner joint member located inside of the outer joint member;
a torque transmitting member for transmitting torque between the outer joint member and the inner joint member;
a shaft coupled with the inner joint member so as to transmit torque and extending from an opening of the outer joint member; and
a boot having one end fixed to the outer joint member and another end fixed to the shaft, wherein
at least a part of an outer peripheral surface of the shaft, which is positioned between a part of the shaft coupled with the inner joint member and a part of the shaft to which the another end of the boot is fixed, is coated with a coating film and forms a surface roughness control part satisfying Rsk<0, Rpk<2 μm, and Ra<4 μm, and
the surface roughness control part includes all portions of the shaft that contact inner surfaces of the boot when the constant velocity universal joint forms an operational angle.

2. A constant velocity universal joint according to claim 1, wherein the surface roughness control part satisfies Ra<3 μm instead of Ra<4 μm.

3. A constant velocity universal joint according to claim 2, wherein the boot has a bellows portion.

4. A constant velocity universal joint according to claim 2, wherein the boot is made of thermoplastic polyester elastomer.

5. A constant velocity universal joint according to claim 1, wherein the surface roughness control part satisfies Rpk<1 µm and Ra<1 µm instead of Rpk<2 µm and Ra<4 µm.

6. A constant velocity universal joint according to claim 5, wherein the boot has a bellows portion.

7. A constant velocity universal joint according to claim 5, wherein the boot is made of thermoplastic polyester elastomer.

8. A constant velocity universal joint according to claim 1, wherein the boot has a bellows portion.

9. A constant velocity universal joint according to claim 1, wherein the boot is made of thermoplastic polyester elastomer.

* * * * *